Sept. 22, 1964     E. W. BOLLMEIER     3,150,221
METHOD OF MAKING A CABLE CONNECTION
Filed Jan. 19, 1962
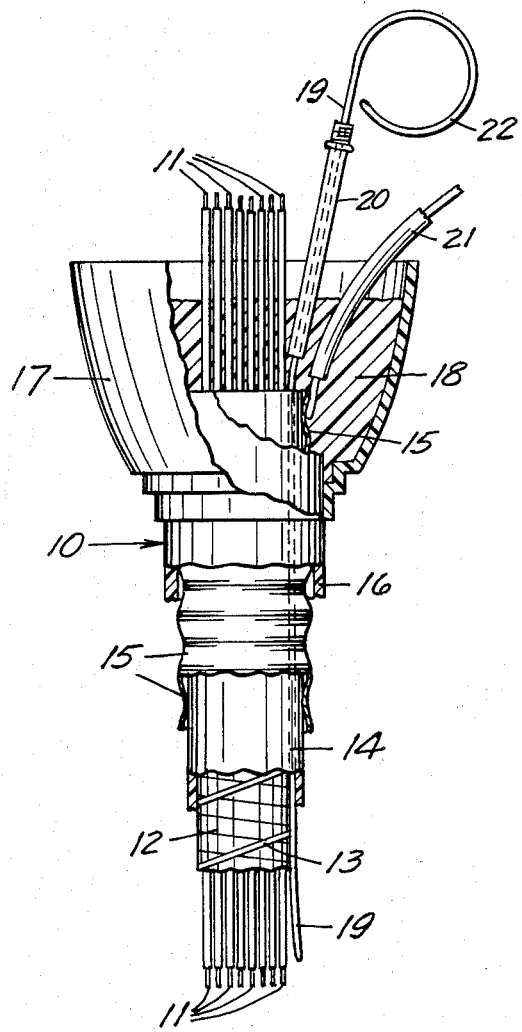
INVENTOR
*Emil Wayne Bollmeier*
BY
*Carpenter, Abbott, Coulter & Kinney*
ATTORNEYS

United States Patent Office 3,150,221
Patented Sept. 22, 1964

3,150,221
METHOD OF MAKING A CABLE CONNECTION
Emil Wayne Bollmeier, St. Paul, Minn., assignor to Minnesota Mining and Manufacturing Company, St. Paul, Minn., a corporation of Delaware
Filed Jan. 19, 1962, Ser. No. 167,380
2 Claims. (Cl. 264—278)

This invention relates to the connecting or splicing of segments of sheathed cables and has particular reference to the splicing of communications cables which are maintained under internal pneumatic pressure.

A typical form of telephone cable consists of a bundle of plastic-insulated small copper wires wrapped loosely with a spiraled or longitudinally lapped strip of plastic film and encased in a single- or double-walled rubbery or plastic sheath having a metal foil shielding member within the outer sheath or between the two. The cable is commonly laid underground, i.e., "direct buried," being brought up at intervals, for example, to provide for splicing and for tapping of service wires at unpressurized road and access type pedestal cases. Entry of moisture into such cables causes degradation of electrical characteristics and must be avoided. To this end dry air is forced into the cable under pressure, and the pressure is continuously maintained. It is essential that adjacent cable-lengths be pneumatically inter-connected, e.g., at splice and termination points, so that the air pressure may be maintained throughout the entire cable.

Prior methods of gas-plugging the cable ends with self-hardening liquid resins and of forming pneumatic connections between cable-ends have been less than fully satisfactory for a variety of reasons. Methods requiring perforation of the outer sheath have frequently resulted in damage to the inner conductors. Methods involving end-wise insertion of permanent connecting tubes into the wire-bundle have likewise resulted in wire damage, or in ineffective flow of air pressure; or the method has been difficult to practice due to the limited space available.

The present invention avoids these and other defects and disadvantages of the prior art. There is provided a novel method for simultaneously sealing and channeling cable-ends which is rapidly and efficiently followed without special training and with no danger of damage to cable components, and in which are employed novel means for providing pneumatic connection with the cable interior.

The practice of the invention will now be described in terms of the formation of an end seal in a plastic insulated telephone cable as illustrated in the accompanying drawing.

The cable 10 is illustrated as consisting of a bundle of plastic-coated copper wires 11 spirally wrapped with an overlapping strip of transparent plastic film 12 held loosely in place by a cord of untwisted filaments 13, the whole being contained within an inner plastic sheath 14, a rolled and longitudinally lapped fluted copper shield 15, and an outer plastic sheath 16. It will be appreciated that the number of wires 11 is reduced for clarity of illustration; a cable of the structure shown and having an outer diameter of approximately ¾ inch may contain, for example, 18 pairs of color-coded polyethylene-coated No. 24 copper wires.

An open-ended conical container 17 is first placed over the end of the cable. The smaller open end of the container fits snugly onto the outer sheath 16 and is slidable thereon. A terminally exteriorly threaded tubular metal tap 20, about ¼ inch in diameter and 2½ inches in length, and which may optionally be knurled or otherwise roughened over its remaining length, is placed over an elongated moderately curved wire probe 19 the forward portion of which is then inserted within the open end of the cable, e.g., between the plastic film 12 and the inner sheath 14 of the cable as shown, or, in a loosely packed cable, centrally of the bundle of wires. The end of the tap 20 is located close to, but not necessarily in contact with, the end of the cable sheath. A wire 21 is connected to the shield 15 either by soldering or by suitable clip means. The container 17 is then slid into position at the end of the sheath as shown, and an encapsulating self-curing liquid resin is poured into the container and permitted to harden, forming the insulating and sealing resinous filler 18. The resin penetrates around and along the individual wires 11, and around the probe 19 and between the sheath 14 and film 12, but to a distance somewhat short of the end of the probe, and sufficient resin is supplied to cover a substantial portion of the length of the tap 20.

In place of the slidable one-part container 17 it will be appreciated that a split mold of the same general shape may be used, the segments being snapped or otherwise held together around the previously prepared cable-end; or the one-piece mold may be applied after the probe member is in place provided the mold opening will pass over the added components.

After the resin has hardened, the probe 19 is twisted to and fro by means of the handle 22 until it is broken loose from the surrounding resin. It is then withdrawn, leaving an open channel to the sealed interior of the cable 10 from the threaded tap 20. Pneumatic interconnection between cable-ends is then easily accomplished by means of flexible hose fitted at both ends with appropriately threaded couplings for connection to the terminally threaded taps, or with other connecting means where non-threaded taps are employed. The wire-ends are connected or tapped as desired, the ground connection is completed through conductor 21, and the entire connection enclosed in a weather-tight junction box or other protective covering.

An effective probe for use with an 18-pair cable as herein described is prepared from a section of steel piano wire of about 2 mm. (.090 inch) diameter and about 10 inches in length, moderately uniformly curved to a radius of about one foot. The leading end of the probe is smoothly rounded to avoid any cutting or tearing of insulation during insertion into the cable. The wire is lightly wiped with a resin-resistant lubricant, preferably a silicone oil or grease, for ease in removal and for rust prevention prior to use. The wire is curved sufficiently to position the tap at an angle to the cable axis but not enough to cause any difficulty either in placing the probe in the cable-end or in later withdrawing it from the tap.

An effective resinous encapsulating composition consists of a self-curing mixture of liquid epoxy resin, liquid polysulfide polymer, and liquid amine catalyst. Typical compositions and means for mixing have been described, for example, in my U.S. Patent No. 2,877,288 wherein is illustrated another means of forming a pneumatic connection between electrically connected sheathed cables. The components are mixed together just prior to application, to form a penetrating but moderately viscous liquid which rapidly cures to a strongly adherent tough and leakproof insulating resin.

The tap 20 fits loosely over the probe 19 and the resin rises within it to essentially the same level as within the container 17. The outer surface of the tap is securely gripped by the resin 18 so that the twisting force required to loosen the probe is insufficient to cause any loosening of the tap within the encapsulating resinous mass. Pre-formed plastic or resinous taps may be substituted for the metal tap 19. Although taps and probes of larger diameter may be used with larger cables, it is equally effective, and usually preferable, to employ instead a plurality of parts of the size indicated, the probe being of approximately the same diameter as the insulated wires of the cable and accordingly fitting alongside such wires in the wire-bundle, and outside of the plastic film 12, without developing any deleterious strains. Smaller components may be used but the size indicated is preferred as providing adequate air flow together with sufficient strength for easy removal of the probe.

The effort required to release and remove the probe is surprisingly small in view of the known strength of bond attained with the preferred resinous encapsulating agents. The release coating of silicone or other grease is partly responsible, and the slight rubberiness or stretchability of the resin is also believed to play a significant part. In any event, it is found possible to release and remove the probe by simple hand twisting and pulling after the resin has completely cured, leaving a permanent effective pneumatic connection to the interior of the otherwise hermetically sealed cable segment.

What is claimed is as follows:

1. In the connecting of open-ended sheathed multiple-conductor cables to provide a continuous pneumatic cable system, the method comprising inserting into the open cable-end an elongate wire probe carrying a tubular tap on the extending outer portion thereof, the inner end of said tap being positioned adjacent said open cable-end; surrounding said cable-end with a tightly fitting open-ended mold; introducing into said mold a quantity of liquid self-hardening resinous encapsulating composition sufficient to fill said mold to a depth well beyond the inner end of said tap; permitting said composition to harden; and then withdrawing said probe to provide a pneumatic connection between the tap and the cable interior.

2. In forming a sealed terminal on a sheathed multiple-conductor pneumatically protected shielded communications cable segment, the steps comprising inserting into the open cable-end and within the pneumatic sheath an elongate narrow probe carrying on its outer extension a tubular tap, encapsulating the entire cable-end with a self-hardening resinous insulating composition of fluidty sufficient to flow around the individual conductors and into the open spaces of said cable-end to a distance short of the tip of the inserted probe and in amount sufficient to encompass the inner end portion of said tap, permitting said composition to harden, and then withdrawing said probe through said tap.

References Cited in the file of this patent

UNITED STATES PATENTS

| | | |
|---|---|---|
| 1,544,855 | Murray | July 7, 1925 |
| 1,845,760 | Murray | Feb. 16, 1932 |
| 2,318,755 | Channell | May 11, 1943 |
| 2,799,089 | Banker | July 16, 1957 |
| 2,877,288 | Bollmeier | Mar. 10, 1959 |
| 2,911,683 | Palermo et al. | Nov. 10, 1959 |
| 2,938,941 | Roberts | May 31, 1960 |
| 2,949,642 | Lieberman | Aug. 23, 1960 |